United States Patent [19]

Moeckl

[11] 3,847,461

[45] Nov. 12, 1974

[54] DATA PROCESSOR

[75] Inventor: Ernst Moeckl, Stuttgart, Germany

[73] Assignee: Nixdorf Computer A.G., Paderborn, Pontanusstr., Germany

[22] Filed: Apr. 16, 1973

[21] Appl. No.: 351,293

[30] Foreign Application Priority Data

Apr. 19, 1972 Germany .......................... 2219074

[52] U.S. Cl. .................. 312/281, 312/223, 312/233

[51] Int. Cl. .............................................. A47b 77/02

[58] Field of Search ........... 312/223, 209, 233, 234, 312/278, 237, 254, 281, 266; 234/55, 56, 57, 58

[56] References Cited

UNITED STATES PATENTS

| | | | |
|---|---|---|---|
| 2,285,159 | 6/1942 | Hanson et al. | 312/233 |
| 2,659,646 | 11/1953 | Attwood | 312/223 |
| 2,840,435 | 6/1958 | Campbell | 312/223 X |
| 3,010,774 | 11/1961 | Doherty | 312/209 |
| 3,170,710 | 2/1965 | Rachman | 312/281 X |
| 3,284,148 | 11/1966 | Ramniceanu | 312/209 |
| 3,606,034 | 10/1971 | Lewis | 312/223 |
| 3,640,596 | 2/1972 | Kanitz | 312/223 |
| 3,642,197 | 2/1972 | Bean et al. | 234/56 |

*Primary Examiner*—James T. McCall
*Attorney, Agent, or Firm*—Haukc, Gifford, Patalidis & Dumont

[57] ABSTRACT

A data processor comprising an information input area, an information carrier-reception area and an information representation area arranged one above the other on a vertical line running parallel to the vertical body axis of an operator situated in front of the machine.

11 Claims, 4 Drawing Figures

PATENTED NOV 12 1974 3,847,461

SHEET 1 OF 2

DATA PROCESSOR

BACKGROUND OF THE INVENTION

I. Field of the Invention

The present invention relates broadly to data processing equipment and more particularly to a new arrangement for the information input area, the information carrier-reception area and the information representation area for such equipment.

II. Description of the Prior Art

Until now, data processors of this type have been so designed that on the top surface of a box-like or desk-like member, there are arranged an information input area and an information representation area on a common level. The information input area contains one or more keyboards which serve as the means for feeding the data or information to be processed into the data processor. The processed information bits are carried to a data printer or a visual display unit and printed on recording material which generally is passed through the printer in the form of a paper tape which is then carried to a reception pocket where it is stored in a folded condition.

Data processors of this design suffer from the serious disadvantage that it is necessary for the operator to concentrate all his activity at one level, i.e., the level of the information input area which contains the keyboards, the data printer, and, if necessary, inserts of magnetic recording carriers, and other operational elements. Thus, it is necessary for the operator to execute body motions in addition to his manual activity, which motions are very fatiguing and lead to postural defects. This has been especially disclosed by motion studies and motion analysis conducted at the work stations for such processors whereby concentration associated with increased body stress has been shown to result in premature fatigue.

Until now, one level for all operational areas of a data processor was necessary because the printing mechanisms of the data printers had to be mechanically coupled to the input keyboards directly and their zone for printing could be viewed only from above. The reasons for this is that when large numbers of the hitherto customary data processors are to be installed, only one specific embodiment can be used on a commercial scale, in which embodiment the data printers operate, for example, with type levers or similar elements which uncover the zone for printing only to the extent of allowing an oblique view from above.

Starting with these disadvantages of known data processors, the invention undertakes the task of devising a data processing machine which eases the stress on the operator and makes functional operation possible. Specifically, postural defects of the operators will be prevented even after they have worked for a prolonged time at a data processing machine.

Simultaneously, the operation will be simplified considerably.

According to the invention, an apparatus of the above mentioned type for solving this task is characterized in that sequentially, the information input area, the information-carrier-reception area, and the information representation area are arranged one above the other on a vertical line which runs parallel to the vertical body axis of an operator situated in front of the machine.

Such a data processor can be realized especially well with mosaic printers and it is possible to achieve considerable simplification of the operation and to attain thereby significant advantages also with respect to the bodily stress of the operator. In contradistinction to the arrangements hitherto known, the individual areas of the data processor are no longer arranged horizontally, but vertically, one above the other. This makes it possible that as before, the reach of manual operation is arranged at shoulder level of the operator, however, a much larger space can be utilized. The information representation area is approximately at eye level of the operator permitting comfortable body posture and at the same time, making it possible that when information bits are put in or recalled by the keyboards, they or their results can be read at eye level in the information representation area. Thereby, use is made of the natural tendency of trained persons who during the operation tend to observe not the information input area, but the information representation area.

In the middle between the input area and the information representation area, there is located the information-carrier-reception area. This area serves for depositing records, accounting forms or other information carriers containing information to be introduced into the input area of the machine. Thus, the different distribution of the various elements of the apparatus of the invention makes it possible to provide more space between the eye level and the shoulder level of the operator so that in the reception area, there are formed relatively large bearing surfaces for the information carriers. Even a tilting of such bearing surfaces can be arranged as will be apparent from the following description.

The arrangement of the present invention makes it possible to choose different modes of constructing data processors, all of which have the common characteristic of the vertical sequential line for the indivdual areas. Thus, for example, a modern appearance can be achieved by an extensively asymmetrically designed machine which in the input area only contains a desk-like arrangement, but at the sides is connected by columnar connecting elements which partially serve as supports or consoles.

As a matter of fact, the input area is provided only for input elements, hence, an arrangement according to the present invention can provide for several keyboards which are functional and suitable for the bodily posture. Thus, it is possible, for example, to arrange the keyboards in such a manner that their symmetry lines slope with respect to each other, i.e., that they can be reached within the natural reaching zone of the operator without the operation requiring special effort. Furthermore, it is important that with the present invention the information representation area can be adapted to the natural viewing angle.

DESCRIPTION OF THE DRAWINGS

A data processor according to the present invention is described subsequently by an embodiment illustrated in the drawings.

In particular.

DESCRIPTION OF A PREFERRED EMBODIMENT

Figure 1:
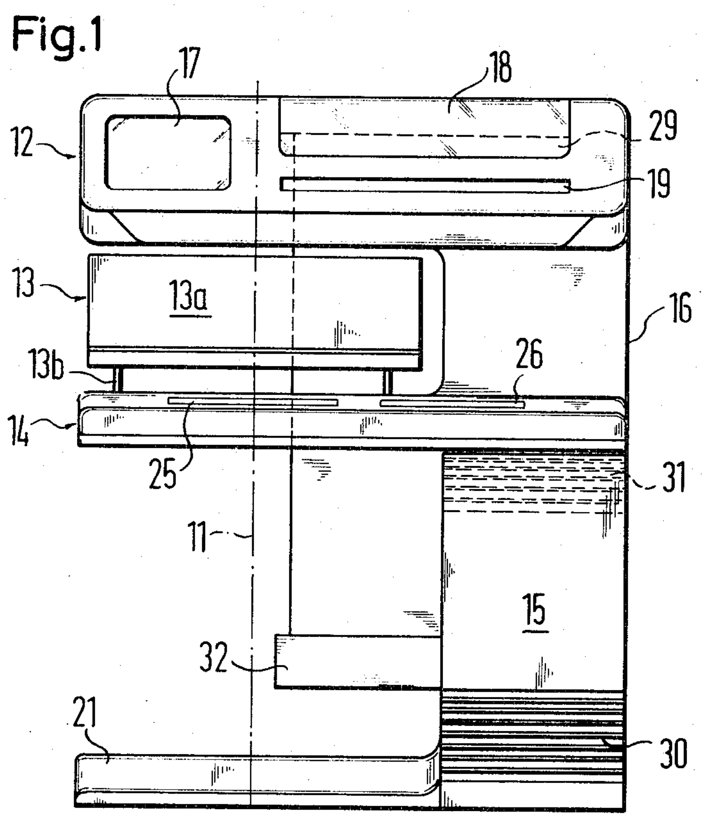
FIG. 1 shows a data processor according to the present invention as seen in a lateral view from the service side.

FIG. 1 depicts a data processor viewed from the service side.

Dash-dotted vertical line 11 runs parallel to the body axis of the operator, and it is easy to perceive that information input area 14, information carrier-reception area 13, and information representation area 12 are arranged along the line 11. The machine is asymmetrically constructed and the individual areas 14, 13 and 12 are connected by a columnar structure. Column 16 is disposed between the information representation area 12 and the information input area 14 and below the latter, there is provided a console-like box 15, which, for instance, can contain all the electronic means appropriate for the machine and moreover is provided with entrance slits 30 at the service side and with exit slits 31 at the back for cooling by air. This box serves as a support for the whole machine.

The information input area 14 contains two keyboards 25, 26, however, more keyboards can be provided. Advantageously, the keyboard 25 is an alphanumerical keyboard the information elements of which are to be observed in the information representation area 12. This keyboard is disposed symmetrically to the above named vertical line 11.

The information input area 14 can be formed as a desk, as set forth more clearly in the subsequent description. Below this desk, a space for the operator's legs is formed by the bottom surface of the desk, a lateral surface of the console-like box 15, and footstep 21.

In the preferred embodiment described here for carrying out the invention, the information representation area 12 contains a data printer 29 and a data visual-display unit 17. These devices are arranged on eye level AP (FIG. 3) of the operator, hence, the latter can work without fatigue for long periods of time and when correspondingly experienced or trained, can directly view the devices 17 or 29, observing the data which has been put in via the keyboards 25 and/or 26 and, if necessary, processed. This viewing is possible in the case of the data printer 29 because a transparent covering 18 is provided which can be formed as a lid, providing access to the printer 29. Furthermore, field 19 for control lamps, adjusting elements, and the like can be provided in the front face of the information representation area 12. Below the information area, one can see a reception pocket 32 which is disposed at the back of the machine and which receives paper tape 22 leaving the data printer 29 at the back of the machine and also entering at this place.

Figure 2:
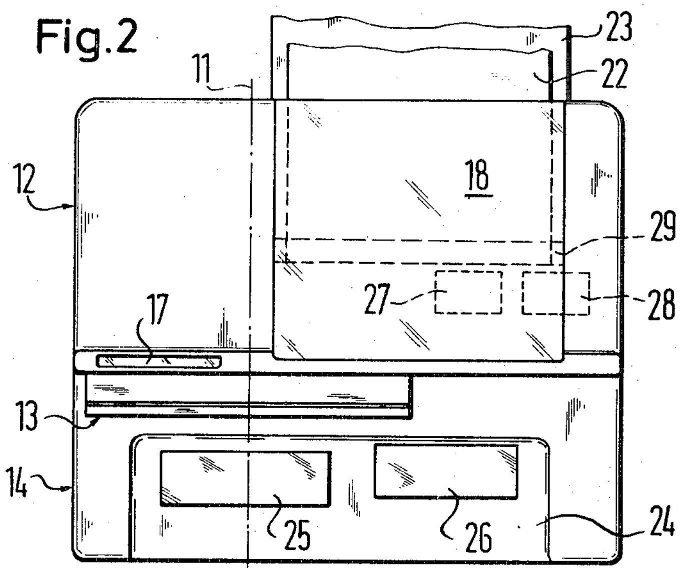
FIG. 2 shows a top view of the data processor of the present invention.

FIG. 2 illustrates a top view of the data processor shown in FIG. 1. It is easy to perceive that the information representation area 12 has less depth than the information input area 14 and that the front face of the area 12 slopes toward the bottom so that the data visual-display unit 17 with its viewing area can be also recognized in the top view.

Furthermore, there is represented the transparent covering 18 through which the data printer 29, the field for service elements 19, and the paper tape 22 can be perceived. Moreover, the housing can be provided with lamps which illuminate the data printer 29 and the bearing surface 12*a*, thus improving the evaluation of the information.

Furthermore, the top view illustrates that the input keyboards 25 and 26 are staggered in the direction of the depth of the machine. This can be an advantage with regard to comfortable operating positions, likewise, the symmetry lines of the keyboards 25 and 26 can slope with respect to each other so that only a swinging motion of the arm, but not a rotary motion of the whole body is required to reach the additional keyboard 26 from the operator's position on line 11.

The reception area 13 contains bearing surface 13*a* which can be tilted to various operating positions. All the space between the two areas 12 and 14 is available for this purpose. In FIG. 2, the bearing surface 13*a* is depicted as sloping so that its projection can be seen. However, a horizontal disposition of this surface 13*a* is likewise possible whereby it can also be lowered into the level of the information input area 14.

Since the printer 29 is disposed in the upper information representation area 12, increased space is available for the information input area 14, hence, storage spaces for magnetic tape cassettes or similar data carriers can be provided which, if necessary, are equipped with lids 27 and 28.

Figure 3:
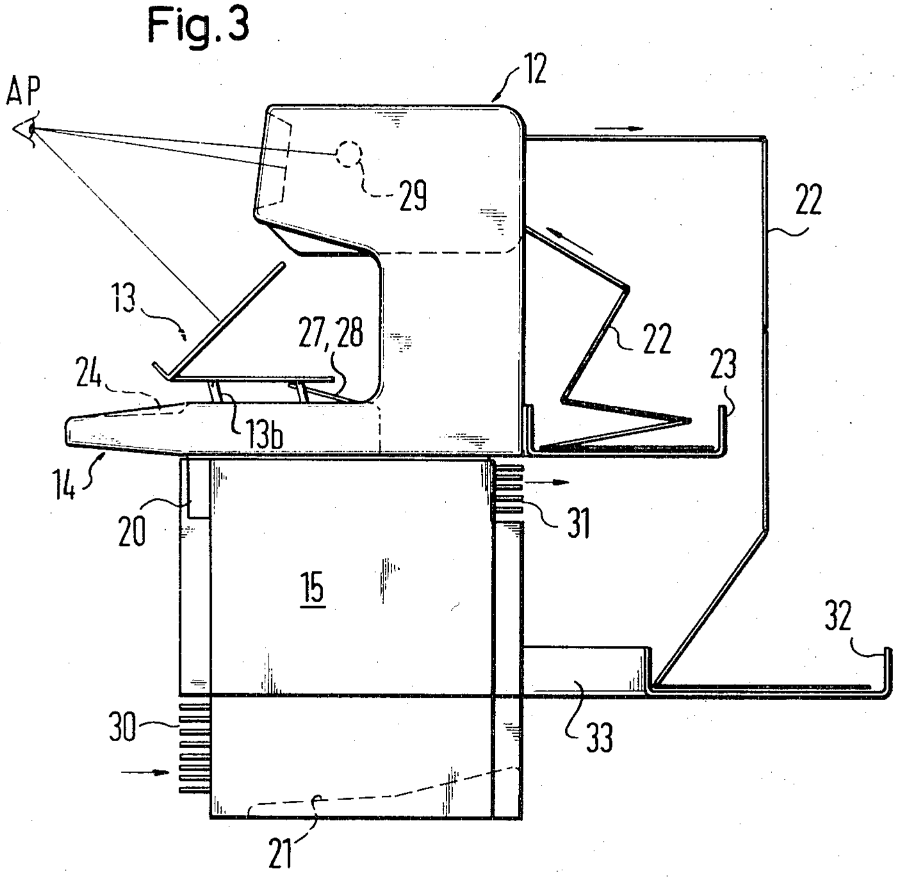
FIG. 3 shows a narrow-side view of the data processor according to the present invention.

FIG. 3 depicts a lateral view of a data processor according to the invention. The eye level point AP of an operator is situated at the level of the information representation area 12. Thereby, the line for viewing the data printer 29 is immediately cleared because the information representation area 12 is provided with the described transparent covering 18. It is further evident from FIG. 3 that the information input area 14 is formed like a desk and is provided with a recess 24 for the keyboards 25 and 26 as is customary in the case of such machines. It is possible to provide the console 15 with lateral area 20 which is equipped with plugs for electrical feed or connecting lines so that further devices can be connected, if necessary, laterally and can form a unit with the described construction. Furthermore, above and below the console 15, one can perceive entrance slits 30 and exit slits 31 through which cold air can flow in the direction of the respective arrows. At the back of the machine, there is disposed the previously described reception pocket 32 which is attached to the console 15 by a mounting 33. The recording carrier 22 which is led to the data printer 29 from the storage pocket 23 runs into the reception pocket 33. For this purpose, corresponding openings are provided at the back of information representation area 12. The recording carrier 22 has a staggered direction of motion so that it can be deposited in the respective pocket 23 or 32 laid in folds. FIG. 3 further depicts the disposition of the bearing surface 13*a* on the supports 13*b* which can be tilted in the direction of the depth of the machine and which with the mounting 13*c* for the bearing surface 13*a* form a parallelogram so that the bearing surface 13*a* can be tilted in various planes whereby its tilting axis is adjustable in the direction of the depth of the machine.

Figure 4:
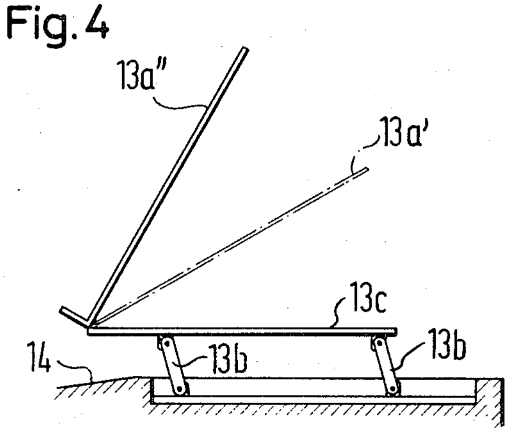
FIG. 4 shows a part of the information carrier-reception area of the data processor of the present invention.

FIG. 4 shows an enlarged picture of the bearing surface 13*a*. The latter with its support 13*b* is so disposed in a recess of the information input area 14 that, if necessary, it can be totally lowered when, for example, the supports 13*b* are extended like a telescope. Moreover, the bearing surface 13*a* is depicted in different tilting positions, 13*a'* and 13*a''*.

It is apparent that a novel arrangement for a data processor has been described. It is also apparent that although a single embodiment of the present invention has been described modifications can be made without departing from the spirit of the invention or the scope of the appended claims.

I claim:

1. A data processing machine comprising a data input area provided with means for feeding data into the machine, a support area provided with means for supporting a document or other member provided with information corresponding to said data, and a display area provided with means for visually displaying said data, the data input area and the support area being arranged beneath the display area said support area being disposed between the data input area and the display area and rearward of said data input area.

2. A machine as claimed in claim 1 in which the data input area is disposed substantially at the level of the arms or hands of a seated operator of the machine, while the display area is disposed substantially at the eye-level of the seated operator.

3. A machine as claimed in claim 1 in which the data input area is provided with a first keyboard and at least one further keyboard.

4. A machine as claimed in claim 3 in which the further keyboard is offset relative to the first in the direction of the depth of the machine.

5. A machine as claimed in claim 3 in which the keyboards have axes of symmetry which extend obliquely to each other.

6. A machine as claimed in claim 1 in which the means for supporting a document or other member is provided with a support surface which can be disposed at the same level as the data input area and, which also can be moved into an operational position between the data input area and the display area.

7. A machine as claimed in claim 6 in which the support surface is angularly adjustable between a horizontal and a vertical plane and in addition said support surface has a pivot axis to independently adjust said support surface in the direction of the depth of the machine.

8. A machine as claimed in claim 1 in which the display area has at least one data printer therein.

9. A machine as claimed in claim 1 in which the display area is provided with a housing having inlet and outlet apertures for data recording material at the rear of the housing.

10. A machine as claimed in claim 9 in which the housing has a transparent portion through which the data recording material may be seen.

11. A machine as claimed in claim 1 in which the means for feeding data into the machine is supported by a pedestal member which is spaced from the front of the data input area by a distance sufficient to provide leg room for an operator seated at the machine.

* * * * *